United States Patent
Koseoglu

(10) Patent No.: US 9,394,493 B2
(45) Date of Patent: Jul. 19, 2016

(54) PRESSURE CASCADED TWO-STAGE HYDROCRACKING UNIT

(75) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 130 days.

(21) Appl. No.: 13/415,187

(22) Filed: Mar. 8, 2012

(65) Prior Publication Data

US 2012/0189505 A1 Jul. 26, 2012

Related U.S. Application Data

(62) Division of application No. 12/574,115, filed on Oct. 6, 2009.

(51) Int. Cl.
| | |
|---|---|
| *C10G 65/10* | (2006.01) |
| *C10G 45/08* | (2006.01) |
| *C10G 47/16* | (2006.01) |
| *C10G 65/12* | (2006.01) |
| *B01J 23/888* | (2006.01) |
| *B01J 29/076* | (2006.01) |

(52) U.S. Cl.
CPC ............. *C10G 65/10* (2013.01); *C10G 45/08* (2013.01); *C10G 47/16* (2013.01); *C10G 65/12* (2013.01); *B01J 23/8885* (2013.01); *B01J 29/076* (2013.01); *B01J 2219/0004* (2013.01); *B01J 2219/00006* (2013.01); *C10G 2300/202* (2013.01); *C10G 2300/207* (2013.01); *C10G 2300/301* (2013.01); *C10G 2400/02* (2013.01); *C10G 2400/04* (2013.01)

(58) Field of Classification Search
CPC ............................................ B01J 2219/00006
See application file for complete search history.

(56) References Cited

U.S. PATENT DOCUMENTS

| | | | |
|---|---|---|---|
| 3,240,694 A | 3/1966 | Mason et al. | |
| 4,404,088 A * | 9/1983 | Bachtel et al. | 208/59 |
| 4,713,167 A | 12/1987 | Reno et al. | |
| 4,950,384 A | 8/1990 | Groeneveld et al. | |
| 5,013,422 A * | 5/1991 | Absil et al. | 208/27 |
| 5,026,472 A | 6/1991 | Hoehn et al. | |
| 5,885,440 A | 3/1999 | Hoehn et al. | |
| 5,904,835 A | 5/1999 | Thakkar | |
| 6,113,775 A | 9/2000 | Christolini et al. | |
| 6,217,746 B1 | 4/2001 | Thakkar et al. | |
| 6,312,586 B1 | 11/2001 | Kalnes et al. | |

* cited by examiner

*Primary Examiner* — Randy Boyer
(74) *Attorney, Agent, or Firm* — Abelman, Frayne & Schwab

(57) ABSTRACT

An apparatus for hydrocracking an oil feedstock to produce a light oil stream without build-up of heavy polynuclear aromatic (HPNA) hydrocarbons in the recycle stream is provided. The apparatus includes a reactor for hydroprocessing the hydrocarbon feedstock to produce effluents, which are subsequently fractionated. Additional hydroprocessing reactors are provided for hydroprocessing individual fractionated product streams.

5 Claims, 2 Drawing Sheets

PRESSURE CASCADED TWO-STAGE HYDROCRACKING UNIT

RELATED APPLICATIONS

This application is a divisional application of U.S. Ser. No. 12/574,115 filed Oct. 9, 2009, the disclosure of which application is incorporated herein by reference.

BACKGROUND OF THE INVENTION

1. Field of the Invention

This invention relates to an apparatus and a method for processing hydrocarbon by-products that include heavy polynuclear aromatics (HPNA) for the purpose of increasing the production of lighter hydrocarbon fuels, such as gasoline and diesel, in conjunction with the operation of a hydrocracking process.

2. Description of Related Art

Hydrocracking processes are used commercially in a large number of petroleum refineries. They are used to process a variety of feeds boiling in the range of 370° C. to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen to carbon ratio and by removing organosulfur and organonitrogen compounds. The significant economic benefit derived from hydrocracking processes has resulted in substantial development of process improvements and more active catalysts.

Hydrotreating and hydrocracking units generally include two principal zones, reaction and separation. Key parameters such as feedstock quality, product specification/processing objectives and catalysts typically determine the configuration of the reaction zone.

Mild hydrocracking or single stage once-through hydrocracking occurs at operating conditions that are more severe than hydrotreating processes, and less severe than conventional full pressure hydrocracking processes. This hydrocracking process is more cost effective, but typically results in lower product yields and quality. The mild hydrocracking process produces less mid-distillate products of a relatively lower quality as compared to conventional hydrocracking. Single or multiple catalysts systems can be used depending upon the feedstock processed and product specifications. Single stage hydrocracking is the simplest configuration, and are designed to maximize mid-distillate yield over a single or dual catalyst systems. Dual catalyst systems are used in a stacked-bed configuration or in two different reactors.

In a series-flow configuration, the entire hydrotreated/hydrocracked product stream from the first reactor, including light gases including $C_1$-$C_4$, $H_2S$, $NH_3$, and all remaining hydrocarbons, are sent to the second reactor. In two-stage configurations, the feedstock is refined by passing it over a hydrotreating catalyst bed in the first reactor. The effluents are passed to a fractionator column to separate the $H_2S$, $NH_3$, light gases ($C_1$-$C_4$), naphtha and diesel products boiling in the temperature range of 36-370° C. The hydrocarbons boiling above 370° C. are then passed to the second reactor.

The formation of heavy polynuclear aromatics ("HPNA") is an undesirable side reaction that occurs in recycle hydrocrackers. The HPNA molecules form by dehydrogenation of larger hydro-aromatic molecules or cyclization of side chains onto existing HPNAs followed by dehydrogenation, which is favored as the reaction temperature increases. HPNA formation depends on many known factors including the type of feedstock, catalyst selection, process configuration, and operating conditions. Since HPNAs accumulate in the recycle system and then cause equipment fouling, HPNA formation must be controlled in the hydrocracking process.

Referring to FIG. 1, a conventional two-stage hydrocracking unit with recycling of unconverted fractions is illustrated in greater detail. A feedstock 11 is hydrotreated/hydrocracked in a first reactor 10 over a hydrotreating catalyst bed, usually comprising amorphous based catalyst(s), such as amorphous alumina or silica alumina substrates containing Ni/Mo, Ni/W or Co/Mo metals as the active phase. The first reactor effluents 12 are then fractionated, and the light fractions 21 containing $H_2S$, $NH_3$, $C_1$-$C_4$ gases, naphtha and diesel fractions boiling up to a nominal boiling point of 370° C. are separated. The hydrocarbon fraction 22 boiling above 370° C. are then sent to the second reactor 30 containing amorphous and/or zeolite based catalyst(s) having Ni/Mo or Ni/W metals as the active phase. The effluents 31 from the second reactor 30 are sent to the fractionator 20, in a combined stream 13 with effluent 12 from the first reactor 10, for separation of cracked components. The HPNA molecules form during the process and accumulate in the recycle stream. Therefore, in conventional two-stage hydrocracking processes, HPNAs must be rejected via a bleed stream 23 or processed separately to eliminate equipment fouling, or an effective catalyst must be used to eliminate the formation of HPNAs or to hydrogenate and hydrocrack these heavy molecules into smaller ones.

A number of references illustrate the use of multiple hydrocracking zones within an overall hydrocracking unit. The terminology "hydrocracking zone" is employed because hydrocracking units often contain several individual reactors. A hydrocracking zone can contain two or more reactors.

For instance, U.S. Pat. No. 3,240,694 illustrates a hydrocracking process in which a feed stream is directed into a fractionation column and divided into a light fraction and a heavy fraction. The light fraction passes through a hydrotreating zone and then into a first hydrocracking zone. The heavy fraction is passed into a second, separate hydrocracking zone, with the effluent being fractionated in a separate fractionation zone to yield a light product fraction, an intermediate fraction which is passed into the first hydrocracking zone, and a bottoms fraction which is recycled to the second hydrocracking zone.

A process is described in U.S. Pat. No. 6,113,775 for hydrocracking difficult to process feed streams at a reduced operating pressure by first dividing the feed stream into a light fraction and a smaller heavy fraction, and processing these fractions in separate reactors. The heavy fraction will normally contain the more difficult to process species and is processed in a once-thru reaction zone. The light fraction is processed in a higher conversion reaction zone which also receives the recycle stream produced in the product fractionation/recovery zone.

In U.S. Pat. No. 5,904,835, a process is described in which a hydrocracking feed stream is processed by passing a portion of the feed stream into each of two reaction zones, with the effluents of the two reaction zones being charged into a common separation and product recovery facility. Unconverted hydrocarbons recovered in the product recovery facility are passed into only one of the reaction zones. An objective of the process described in the '835 patent is to avoid full dual reaction trains.

A process described in U.S. Pat. No. 6,217,746 includes a two-stage hydrocracking process characterized by operation of a second hydrocracking zone at a reduced pressure, which is conducive to cracking the highly paraffinic effluent of the first hydrocracking zone. The process is also characterized by the passage of a partially compressed hydrogen makeup gas stream into the second hydrocracking zone followed by compressing the recovered gas from the second hydrocracking zone effluent to form make-up gas for the first stage hydrocracking zone. No recycle gas stream is provided for the second hydrocracking zone.

In U.S. Pat. No. 6,312,586, a process is described for upgrading heavy hydrocarbons to lighter distillates in a hydrocarbon conversion process which employs several parallel reaction zones each of which contain both hydrotreating and hydrocracking catalyst beds. The feed and liquid recycle from the bottom of the reaction zone is charged to the top of the uppermost catalyst bed. Hydrogen flow is countercurrent to the descending liquid, and products are removed overhead through vapor-liquid contactors. The flow of feed to one of the reaction zones is periodically stopped to allow sequential hydrogen regeneration of the catalysts within the reaction zone.

In U.S. Pat. No. 5,885,440 a hydrocracking process is described which employs a reactor containing a first stage hydrocracking catalyst containing hydrotreating and hydrocracking functions to reduce the recombinant mercaptan content and/or smoke point of a product recovered from the effluent of the hydrocracking reactor. The entire effluent of the hydrocracking reactor is first cooled and then passed through the hydrotreating catalyst reactor. The effluent of the hydrotreating catalyst reactor then continues throughout the customary cooling and separation steps employed in the product recovery system. The second stage effluent is also sent to the fractionator.

A process is described in U.S. Pat. No. 5,026,472 where high boiling hydrocarbons are upgraded to products including low aromatic content kerosene or jet fuel in a dual reaction zone process. Feeds such as gas oils are introduced to a hydrocracking reactor, with the effluent separated into vapor and liquid fractions. The vapor fraction is partially condensed to yield a liquid comprising kerosene/diesel boiling range hydrocarbons which is charged to a hydrogenation reactor. Liquid recovered from both reactors is passed to a common fractionator. Vapor remaining after the partial condensation is passed to a hydrogenation zone product separator to recover recycle hydrogen.

U.S. Pat. No. 4,713,167 discloses a multiple single-stage process for the conversion of heavy hydrocarbonaceous charge stock into a lower boiling distillate hydrocarbon product. Fresh charge stock and hydrogen are introduced into a first catalytic reaction zone for conversion of the feed. Hydrocracked product effluent from the first hydrocracking reaction zone that comprises a predetermined distillate fraction is passed with an cracked effluent from a second catalytic hydrocracking or accucracking reaction zone into a separation zone and separated into various hydrocarbon streams including a light hydrocarbon stream comprising the distillate product, a middle hydrocarbon stream and a heavy hydrocarbon stream. The middle hydrocarbon stream, which includes the distillate fraction and hydrogen, is introduced into the second catalytic hydrocracking or accucracking reaction zone for conversion into a lower boiling accucracked effluent stream comprising the distillate hydrocarbons boiling in the distillate product range.

In U.S. Pat. No. 4,950,384, a process is described in which a hydrocarbonaceous feedstock is hydrocracked by contacting the feedstock in a first reaction stage at elevated temperature and pressure in the presence of hydrogen with a first hydrocracking catalyst to obtain a first effluent, and separating from the first effluent a gaseous phase and a liquid phase at substantially the same temperature and pressure as the first reaction stage. The liquid phase of the first effluent is contacted in a second reaction stage at elevated temperature and pressure in the presence of hydrogen and a second hydrocracking catalyst to obtain a second effluent. At least one distillate fraction and a residual fraction are obtained from the combination of the gaseous phase and the second effluent by fractionation, and at least a portion of the residual fraction is recycled to a reaction stage.

Currently, there are other process solutions disclosed for removing HPNA from a hydrocracking unit. The solutions include installation of an adsorption column, recycling the hydrocracking unit bottoms stream to a vacuum distillation unit, recycling the stream to a solvent deasphalting unit, bleeding a portion of the hydrocracking unit bottoms stream and sending it to a fluid catalytic unit, and installing a separate hydrogenation unit for treating the entire recycle stream.

Other process options are costly and will require additional capital investment and manpower to operate. The option of recycling to the vacuum tower will decrease the vacuum distillation unit capacity and/or require an increase in its size. Removal, known as bleeding, of the recycle stream will cause a substantial yield loss, which will change the process economics substantially.

Therefore, it would be desirable to provide a hydrocracking method and apparatus that is more cost efficient and minimizes yield reduction.

SUMMARY OF THE INVENTION

The above objects and further advantages are achieved by utilizing a method of hydrocracking an oil feedstock to produce a light oil stream without build-up of heavy polynuclear aromatics ("HPNA") hydrocarbons in the recycle stream. The method comprises hydrocracking the oil feedstock with a hydrotreating catalyst in a first reactor to produce an effluent stream. The effluent stream from the first reactor is fractioned into a first, second and third product streams, wherein the first product stream comprises $C_1$-$C_4$, naphtha, and diesel boiling in the range of about 36° C. to about 370° C., the second product stream comprises hydrocarbon components with an initial nominal boiling point of 370° C. and a final boiling point ranging from about 420° C. to about 480° C., and the third product stream boiling above about 420° C. to about 480° C., depending upon the final boiling point of the second product stream, comprises HPNA hydrocarbons. The second product stream is cracked in a second reactor, and the third product stream is cracked in a third reactor. The third reactor operates at a higher pressure than the second reactor, which advantageously reduces the volume requirements of the third reactor.

In one preferred embodiment, the hydrocracking process also includes hydrodesulfurization and hydrodenitrogenation, and the first product stream further includes $H_2S$ and $NH_3$.

In general, the feedstock oil comprises at least one of a vacuum gas oil, deasphalted or demetalized oil from solvent deasphalting process, light and heavy coker gas oils from a coker process, cycle oils from fluid catalytic cracking ("FCC") process derived from crude oils, synthetic crude oils, heavy oils and/or bitumen, shale oil and coal oils.

In another embodiment, the processed hydrocarbons from the second reactor and third reactor are sent to a fractionator.

In yet another preferred embodiment, the hydrotreating catalyst comprises at least one of an amorphous catalyst, zeolite catalyst, or a composite mixture thereof, promoted with Ni, W, Mo and Co metals, to obtain 10% to 80% by volume conversion of hydrocarbons boiling above 370° C. at hydrogen partial pressure in the range of about 100-200 kg/cm$^2$, in certain embodiments about 100-170 kg/cm$^2$, and in further embodiments about 100-150 kg/cm$^2$; and feedstock oil in the range 300-2000 m$^3$ over 1000 m$^3$ of the hydrotreating catalyst per hour. The hydrocarbons boiling above 370° C. are converted to one or more light gases including methane, ethane, propane, n-butane, isobutene, hydrogen sulfide, ammonia, naphtha fractions boiling in the range of 36° C. to 180° C. and/or diesel fractions boiling in the range of 180° C. to 375° C.

In still yet another embodiment, the operational pressure of the third reactor is 30-50 kg/cm$^2$ higher than the second reactor.

In another embodiment, the second reactor contains at least one of a zeolite based catalyst and an amorphous based catalyst.

In a further embodiment, the third reactor contains large pore zeolite based catalyst or amorphous based catalyst, or a combination thereof.

In an additional embodiment, the method includes the step of hydrogenating and cracking the third product stream in the third reactor.

The above objects and further advantages are achieved by utilizing a system for catalytically hydrocracking of an oil feedstock, the system comprising a first reactor for hydrocracking the oil feedstock, wherein the oil feedstock is contacted over a hydrotreating catalyst to produce a mixed effluent stream; a fractionator for fractionating the effluents into a first, second and third product streams, wherein the first product stream comprises $C_1$-$C_4$, naphtha, and diesel boiling in the range of 36-370° C. (and $H_2S$ and $NH_3$ in embodiments where the hydrocracking also includes hydrodesulfurizing and hydrodenitrogenating), the second product stream comprises hydrocarbon components with an initial nominal boiling point of 370° C. and a final boiling point ranging from about 420° C. to about 480° C., and the third product stream comprises HPNA hydrocarbons; a second reactor for hydrocracking the second product stream; and a third reactor for hydrocracking the third product stream, wherein the third reactor operates at a higher pressure than the second reactor and contains larger pore hydrogenation/hydrocracking catalysts.

In the apparatus and process of the present invention, a high pressure third operating at a higher pressure than the second reactor is installed. This two reactor system will reduce the capital investment, because a small fraction of hydrocarbon stream containing HPNA molecules will be processed in the smaller, high pressure third reactor.

The apparatus and process of the present invention solves the problem without the implementation of other HPNA handling processes including recycling to vacuum tower, solvent deasphalting processing and adsorption.

The hydrocracking process configuration of the present invention, in which two reactors operating at different pressures are employed, is used to eliminate the HPNA streams in the hydrocracking process. The process enhances hydrocracking, solves HPNA formation and, in turn, provides an economic benefit related to reduced equipment expenditure.

BRIEF DESCRIPTION OF THE DRAWINGS

The apparatus and method of the present system will be described in further detail below and with reference to the attached drawings where the same or similar elements are referred to by the same numerals, and in which.

DETAILED DESCRIPTION OF THE INVENTION

Figure 1:
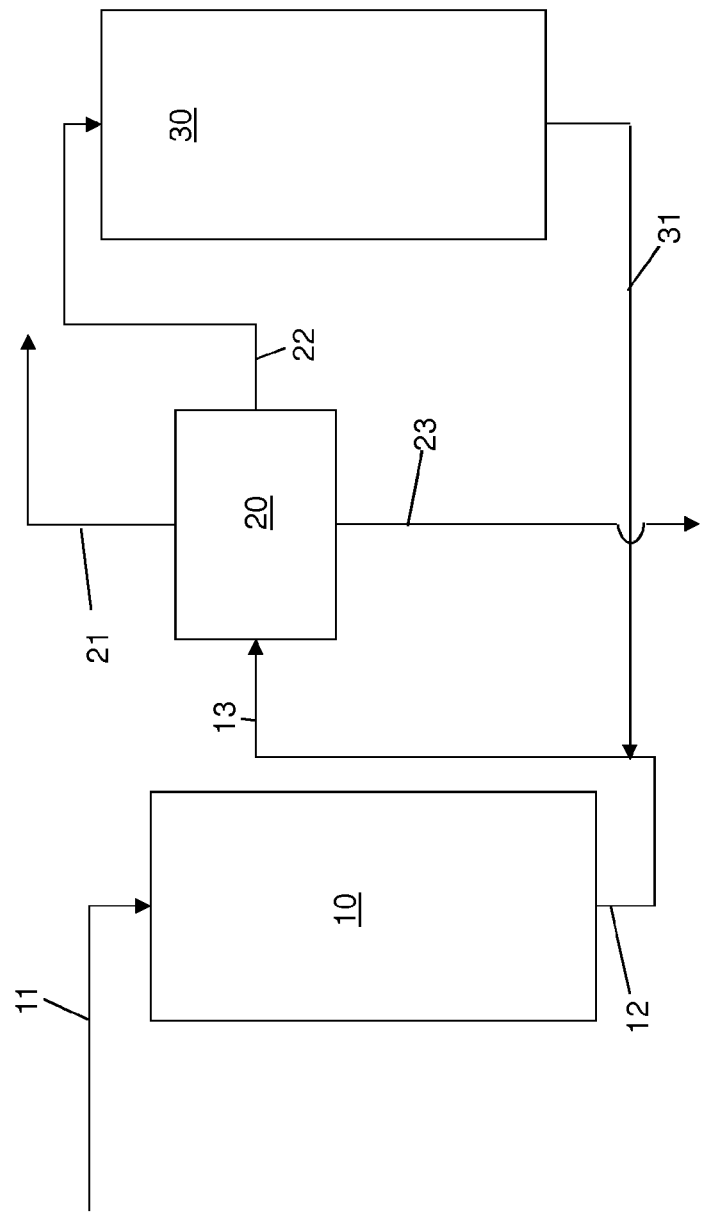
FIG. 1 is a schematic diagram of a prior art two-stage hydrocracking apparatus and process.
Figure 2:
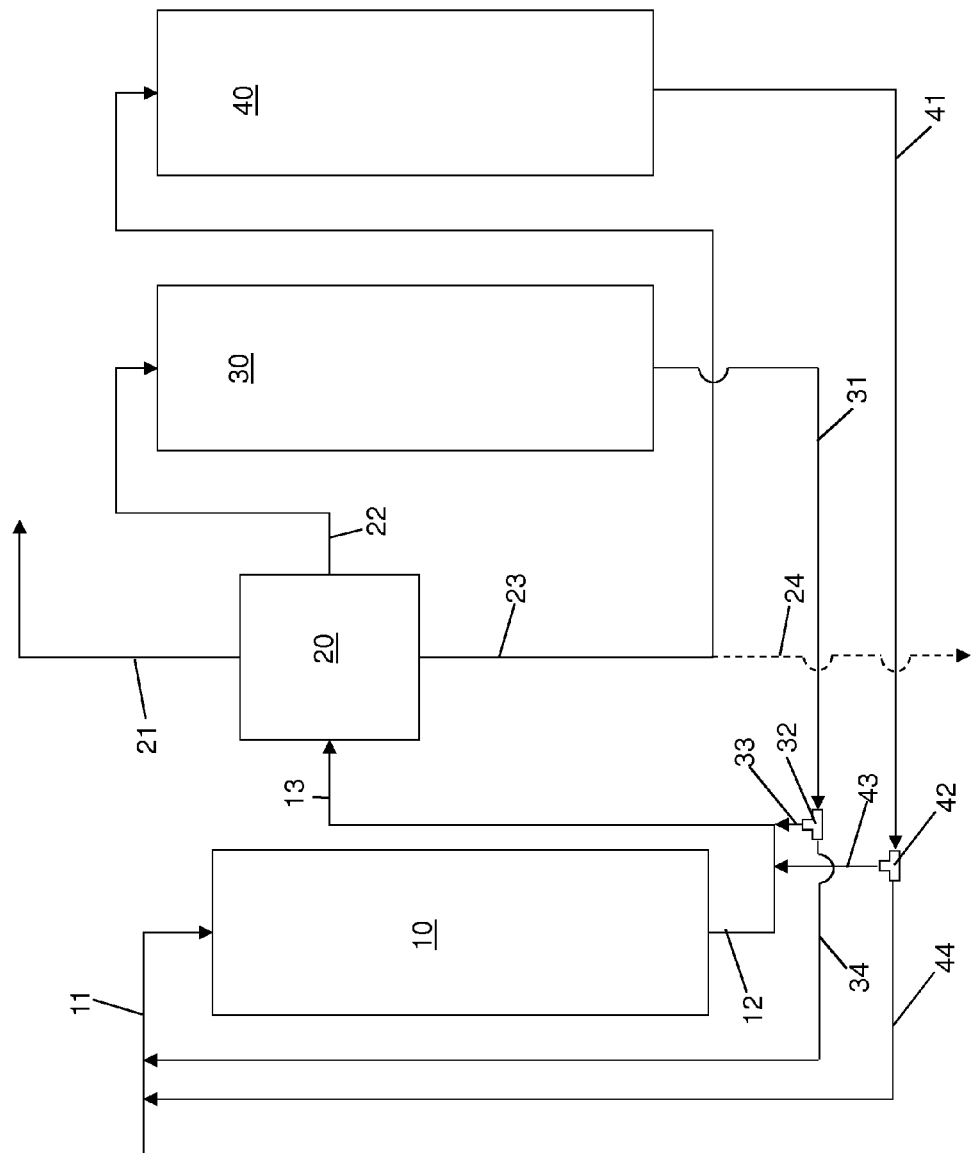
FIG. 2 is a schematic diagram of an embodiment of the apparatus and process of the present system.

FIG. 2 illustrates an embodiment of the process and apparatus of the present invention. In the two-stage recycle hydrocracking process, all of the reactor effluents are sent to the fractionator 20, where the following product streams are separated:

$H_2S$, $NH_3$, light gases including $C_1$-$C_4$;

naphtha and diesel products boiling in the range nominal 36-370° C.;

a fraction with an initial boiling point of 370° C. and final boiling point lower than the feedstock end point, preferably in the range of 420-480° C.; and a fraction boiling above 420° C. to about 480° C., depending upon the final boiling point of the fraction with an initial boiling point of 370° C.

With continued reference to FIG. 2, a feedstock influent stream 11 is introduced into a hydrotreating reactor 10 and is hydrocracked with a first stage hydrocracking catalyst containing hydrotreating and hydrocracking functions to produce an effluent stream 12. The effluent stream 12 is fractioned into a first product stream 21, a second product stream 22 and a third product stream 23. The first product stream 21 comprises $C_1$-$C_4$, naphtha, and diesel boiling in the range of about 36° C. to about 370° C. For feedstocks containing organosulfur and/or organonitrogen compounds that are desulfurized and/or denitrogenized, the first product stream 21 also contains $H_2S$ and/or $NH_3$. The second product stream 22 comprises hydrocarbon components with an initial nominal boiling point of about 370° C. and a final boiling point ranging from about 420° C. to about 480° C. The third product stream 23 boiling above about 420° C. to about 480° C., depending upon the final boiling point of the second product stream, comprises HPNA hydrocarbons. The second product stream 22 is cracked in a second reactor 30, and the third product stream 23 is cracked in a third reactor 40. The third reactor 40 operates at a higher pressure than the second reactor 30, which advantageously reduces the volume requirements of the third reactor.

The product stream 31 is recycled the hydrotreating reactor 10 via line 34 through a three way valve 32 and/or to the second reactor 30 via a line 33 to the fractionator 20. The product stream 23 containing HPNA molecules is sent to the third reactor 40 that is operated at a higher pressure than the second reactor 30. The third reactor 40 contains large pore catalyst that performs hydrogenation and hydrocracking functions. The high boiling point HPNA molecules are hydrogenated and hydrocracked and the effluents 41 is recycled the hydrotreating reactor 10 via line 44 through a three way valve 42 and/or to the second reactor 30 via a line 43 to the fractionator 20.

In a preferred embodiment, the feedstock stream 11 and hydrogen are fed to the first reactor 10 for removal of heteroatoms such as sulfur, nitrogen and trace amounts of metals such as Ni, V and Fe, along with cracking high molecular weight, high boiling temperature molecules into lower molecular weight, lower boiling point temperature hydrocarbons in the range about 5% to about 60% by volume. Effluent stream 12 exiting the first reactor 10 is then sent to fractionator 20 to remove stream 21 containing $H_2S$, $NH_3$, light gases including $C_1$-$C_4$, naphtha and diesel products boiling in the nominal temperature range of about 36° C. to about 370° C.

Stream 22 from fractionator 20 including fractions with an initial nominal boiling point temperature of about 370° C. and final boiling point temperatures ranging from about 420° C. to about 480° C. is sent to the second reactor 30 for cracking of unconverted molecules from the first reactor. Stream 31 includes light gases such as $C_1$-$C_4$; naphtha boiling in the range $C_5$, i.e., about 36° C., to about 180° C., and up to about 200° C. to about 220° C. under certain conditions; and diesel boiling in the range of about 180° C. to about 370° C. Any remaining uncracked hydrocarbon fractions from reactor 30 boiling above about 370° C. are sent to fractionator 20. Stream 23 from fractionator 20 comprising hydrocarbons with an initial boiling point in the range of about 420° C. to about 480° C. and above, and HPNAs, is sent to the third reactor 40 containing large pore catalysts, such as zeolite based catalyst, amorphous silica alumina catalyst and/or amorphous alumina catalyst with hydrogenation and/or hydrocracking active species for further hydrogenation and hydrocracking. As used herein "large" pore catalysts refers to those having average pore diameters of greater than about 100 angstroms, and in certain embodiments having average pore diameters of greater than about 500 angstroms.

The third reactor 40 is operated at higher pressures than the second reactor 30 in order to hydrogenate HPNA molecules. In general, the operating pressure of the third reactor is about 10% to about 100% greater than the operating pressure of the second reactor, in certain embodiments about 30% to about 70% greater than the operating pressure of the second reactor, and in further embodiments about 30% to about 50% greater than the operating pressure of the second reactor. Stream 41 from the third reactor 40 is returned to the fractionator. Stream 13 is comprised of streams 12, 31 and 41. Stream 24, comprising hydrocarbons boiling above 520° C., can be removed from process in the range 1% to 10% by volume.

The system of the present invention utilizes two additional reactors, e.g., the second reactor 30 and the third reactor 40, after the first stage hydrotreating and/or conversion step. The second reactor 30 and third reactor 40 operate at different pressures and contain different catalysts. The operating pressure of third reactor 40 is higher than that of the second reactor 30. The high pressure operation and large pore catalysts in the third reactor 40 contribute to elimination of HPNA molecules from the recycle stream, and lowers the capital cost, because only a small fraction of the original stream containing HPNA compounds is processed in the volumetrically smaller high pressure reactor.

The third reactor 40 is designed to operate at high pressure, but it is only needed to process a small fraction of the total stream. Accordingly, the pressure cascading of the present invention reduces the capital cost of the hydrocracking unit. Large HPNA molecules, hydrogenation of which is favored at higher pressures, can diffuse into the large pores of the catalyst in the third reactor 40, hydrogenates, and cracked into the lower molecular weight compounds. This processing step prevents the build-up of heavy HPNA molecules in the recycle stream without eliminating the use of small pore zeolite based catalysts in the second reactor 30. This configuration does not eliminate the use of zeolite based cracking catalysts completely. The second reactor 30 containing zeolite based catalyst will enhance the cracking of hydrocarbons, while large molecules are hydrogenated in the high pressure third reactor 40.

EXAMPLE

An apparatus having the configuration described and illustrated in FIG. 2 was provided. A feedstock blend containing 15% by volume of demetalized oil ("DMO") and 85% by volume of vacuum gas oil ("VGO") has the distillation characteristics shown in Table 1. The feedstock was introduced at a rate of 300 m³ of feedstock over 1000 m³ of catalyst per hour and subjected to hydrocracking over a catalytic system of amorphous zeolite support catalyst promoted with Ni, W and Mo metals at various temperatures to obtain 30, 50 and 80 volume % conversion of hydrocarbons boiling above 370° C. at 125 kg/cm² hydrogen partial pressure. The $H_2S$, $NH_3$ and light gases were separated from the reactor effluent and the effluent fractionated into two fractions. The cut point between the fractions was varied at 20° C. intervals between 420° C. and 500° C. The lighter cut was sent to the second reactor 30 containing zeolite based cracking catalysts for further cracking. The bottom fraction containing the higher boiling point HPNA molecules was sent to the third reactor 40 containing a zeolite catalyst with macro porosity, operating at a higher pressure than the second reactor 30 for hydrogenation and cracking. HPNA molecules were hydrogenated and cracked in the third high pressure reactor 40 and the products were sent to fractionator column as recycle. The pressure and sizes of second reactor 30 and third reactor 40, respectively, vary with the cut points between the fractions. For example, at 30% conversion in the first stage, as the cut point increases from 420° C. to 500° C., the reactor pressure can increase by 50 to 100 bars. The reactor sizes are the same when the cut point is 460° C. The third reactor can be about 50% smaller when the cut point is increased to 500° C.

As noted above, Table 1 includes the distillation characteristics of a first stage feedstock containing 15% by volume DMO and 85% by volume VGO and the first stage conversion products of the cracked feedstock.

TABLE 1

| W % off* | Feed (° C.) | 30% by volume Conversion (° C.) | 50% by volume Conversion (° C.) | 80% by volume Conversion (° C.) |
|---|---|---|---|---|
| 0 | 253 | 81 | 60 | 57 |
| 10 | 364 | 199 | 136 | 107 |
| 30 | 425 | 326 | 244 | 168 |
| 50 | 464 | 403 | 337 | 232 |
| 70 | 503 | 456 | 416 | 306 |
| 90 | 562 | 525 | 497 | 409 |
| 100 | 606 | not available | not available | not available |

*"W % off" refers to the weight percent of the oil fraction recovered at the boiling temperature shown.

The products from the second reactor 30 and third reactor 40 can be selected from hydrocarbons boiling at, or below 370° C., that produce intermediate products such as naphtha and diesel.

The volumes of the reactors can be on the order of 10 m³ to about 200 m³, and from preferably about 20 m³ to about 50 m³. Relative catalyst or reactor volumes for the second reactor 30 and third reactor 40 are shown in Table 2. The size requirements for the third reactor and/or its catalyst requirements decreases at higher temperature cut points. At 50 volume % conversion of hydrocarbons boiling above 370° C. in the first stage and a cut point of 480° C. at the fractionator 20, the third reactor 40 size becomes 60% smaller than the second reactor 30 while the pressure differential is about 30-50 bars higher.

TABLE 2

| | Reactor and Catalyst Volume Requirement | | | | | |
|---|---|---|---|---|---|---|
| Fractionator Cut Point | 2nd Reactor | 3rd Reactor | 2nd Reactor | 3rd Reactor | 2nd Reactor | 3rd Reactor |
| | First Stage Conversion, volume % | | | | | |
| °C. | 30% | 30% | 50% | 50% | 80% | 80% |
| 420 | 25.9 m³ | 74.1 m³ | 30.6 m³ | 69.4 m³ | 47.4 m³ | 52.6 m³ |
| 440 | 36.8 m³ | 63 m³ | 42.5 m³ | 57.5 m³ | 65.7 m³ | 34.3 m³ |
| 460 | 47.5 m³ | 53 m³ | 54.1 m³ | 45.9 m³ | 84.9 m³ | 15.1 m³ |
| 480 | 57.7 m³ | 42 m³ | 70.2 m³ | 29.8 m³ | 100.0 m³ | 0.0 m³ |

The values presented in Table 2 are relative volumes. For instance, at 50 volume % conversion, the second reactor volume requirement is 30.6 m³, and the third reactor volume requirement is 69.4 m³.

The present system has been illustrated and described with reference to a number of specific embodiments. As will be apparent to one of ordinary skill in the art, modifications and other combinations of the elements and functions can be undertaken without departing from the invention, scope of which is to be determined with reference to the attached claims.

The invention claimed is:

1. An apparatus for catalytically cracking an oil feedstock comprising:
   a first hydroprocessing reactor including an inlet and an outlet and containing catalysts having hydrotreating and hydrocracking functions;
   a fractionator having an inlet in fluid communication with the outlet of the first reactor, the fractionator including an overhead outlet, a middle outlet and a bottom outlet;
   a second hydroprocessing reactor including an inlet in fluid communication with the middle outlet of the fractionator and an outlet in fluid communication with the inlet of the fractionator and/or the inlet of the first hydroprocessing reactor, the second hydroprocessing reactor containing catalysts having a first average pore size; and
   a third hydroprocessing reactor including an inlet in fluid communication with the bottom outlet of the fractionator and an outlet in fluid communication with the inlet of the fractionator and/or the inlet of the first hydroprocessing reactor, the third hydroprocessing reactor containing catalysts having a second average pore size, the second average pore size being larger than the first average pore size.

2. The apparatus of claim 1, wherein the third hydroprocessing reactor has a smaller volume than the second hydroprocessing reactor.

3. The apparatus of claim 1, wherein the first average pore size is less than or equal to about 100 angstroms and the second average pore size is greater than 100 angstroms.

4. The apparatus of claim 3, wherein the second average pore size is greater than or equal to 500 angstroms.

5. The apparatus as in claim 1, wherein the bottom outlet of fractionator further comprises a process discharge outlet for removing a portion of the content of fractionator from the apparatus.

* * * * *